United States Patent
Cohen et al.

(10) Patent No.: US 6,657,723 B2
(45) Date of Patent: Dec. 2, 2003

(54) MULTIMODE PLANAR SPECTROGRAPHS FOR WAVELENGTH DEMULTIPLEXING AND METHODS OF FABRICATION

(75) Inventors: Mitchell S. Cohen, Bedford, MA (US); George A. Sefler, Mount Kisco, NY (US); James L. Speidell, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 09/736,006

(22) Filed: Dec. 13, 2000

(65) Prior Publication Data

US 2003/0197862 A1 Oct. 23, 2003

(51) Int. Cl.$^7$ .................................................. G01J 3/28
(52) U.S. Cl. .......................................... 356/328; 385/14
(58) Field of Search ............................ 356/328; 385/14

(56) References Cited

U.S. PATENT DOCUMENTS

| | | | | |
|---|---|---|---|---|
| 4,405,405 A | * | 9/1983 | Fujii et al. | 156/212 |
| 4,634,215 A | * | 1/1987 | Reule | 359/124 |
| 5,026,160 A | * | 6/1991 | Dorain et al. | 356/328 |
| 5,159,404 A | * | 10/1992 | Bittner | 356/328 |
| 5,327,450 A | * | 7/1994 | Fujii | 372/45 |
| 5,355,237 A | * | 10/1994 | Lang et al. | 359/130 |
| 5,675,675 A | * | 10/1997 | Trouchet | 385/14 |
| 5,937,113 A | * | 8/1999 | He et al. | 385/11 |
| 6,088,496 A | * | 7/2000 | Asghari | 385/37 |
| 6,097,863 A | * | 8/2000 | Chowdhury | 359/566 |
| 6,169,838 B1 | * | 1/2001 | He et al. | 385/10 |
| 6,303,934 B1 | * | 10/2001 | Daly et al. | 250/339.02 |
| 6,304,692 B1 | * | 10/2001 | Sappey et al. | 359/130 |
| 6,399,405 B1 | * | 6/2002 | Chen et al. | 216/2 |

OTHER PUBLICATIONS

Mohr et al., "Fabrication of a Planar Grating Spectrograph by Deep–etch Lithography with Synchrotron Radiation", Sensors and Actuators A, 25–27 (1991) 571–575.

Yen, et al., "Planar Rowland spectrometer for fiber–optic wavelength demultiplexing", Optics Letters, vol. 6, No. 12, 639–641, Dec. 1981.

Suhara et al., "Integrated–optic wavelength multi– and demultiplexers using a chirped grating and an ion–exchanged waveguide", Applied Optics, vol. 21, No. 12, pp. 2195–2198, Jun. 15, 1982.

Beranek, et al., "Physical Design and Fabrication of a Multiple Element Slab Waveguide Spectrograph for Multimode Fiber–Optic WDM Systems", IEEE Transactions on Components, Hybrids, and Manufacturing Technology, vol. 16, No. 5, pp. 511–515, Aug. 1993.

Capron, et al., "Design and Performance of a Multiple Element Slab Waveguid Spectrograph for Multimode Fiber–Optic WDM Systems", IEEE Journal of Lightwave Technology, vol. 11, No. 12, pp. 2009–2014, Dec. 1993.

Lemoff, et al., "A Compact, Low–Cost WDM Transceiver for the LAN", IEEE 2000 Electronic Components and Technology Conference, pp. 711–716, Sep. 2000.

* cited by examiner

Primary Examiner—F. L. Evans
Assistant Examiner—Kara Geisel
(74) Attorney, Agent, or Firm—F. Chau&Associates, LLC

(57) ABSTRACT

A planar spectrograph for demultiplexing optical wavelength signals includes a monolithic substrate. The substrate has a diffraction grating etched therein. The diffraction grating is integrally formed in the substrate to be in operative relationship with input light to diffract and reflect the input light to a detector. A recess is formed in the substrate to accommodate a separate slab waveguide. A slab waveguide is dimensioned and configured to fit within the recess, and the waveguide guides input light to and from the diffraction grating. A silicon-on-insulator spectrographs is also described, as well as, fabrication processes for manufacturing these spectrographs.

34 Claims, 9 Drawing Sheets

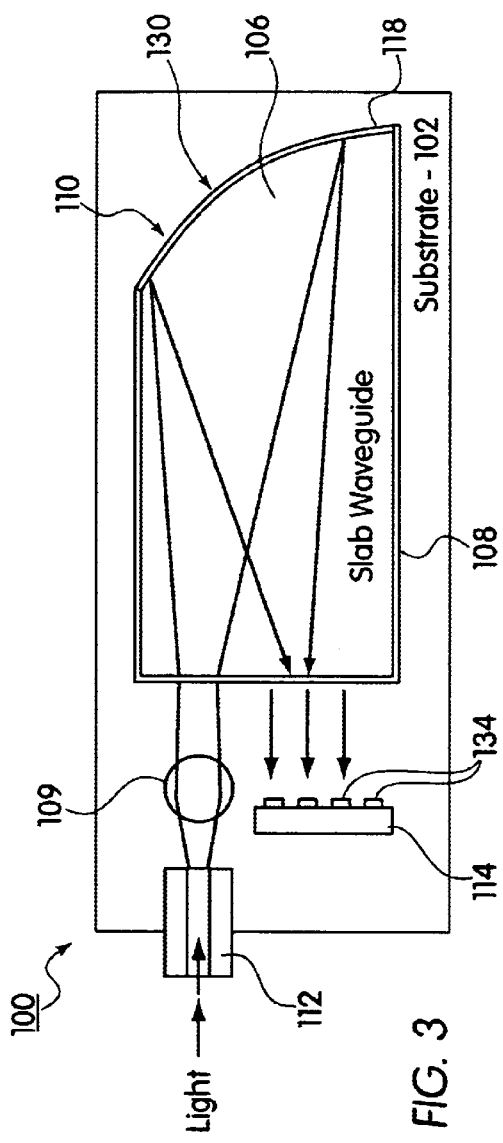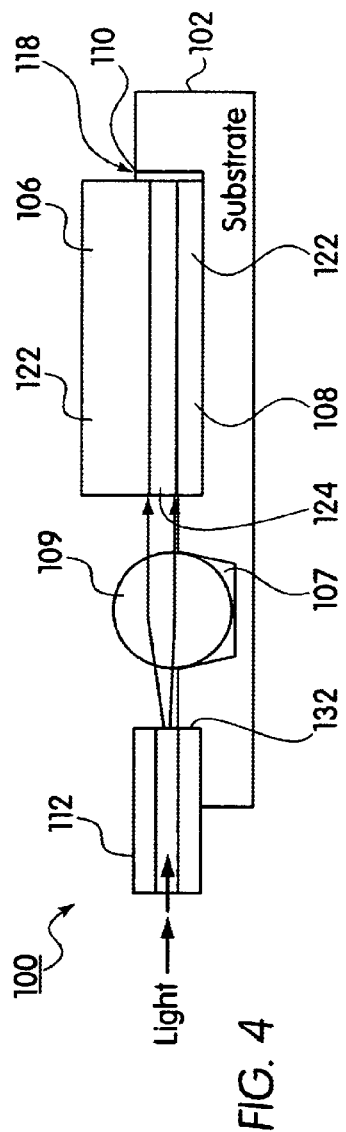
FIG. 3
FIG. 4

MULTIMODE PLANAR SPECTROGRAPHS FOR WAVELENGTH DEMULTIPLEXING AND METHODS OF FABRICATION

BACKGROUND OF THE INVENTION

1. Field of the Invention

The present invention relates to multimode planar spectrographs and methods for their fabrication, and more particularly to planar spectrographs for demultiplexing coarse wavelength division multiplexed (CWDM) optical signals, and methods for fabrication of such spectrographs employing silicon-based processing.

2. Description of the Related Art

Emerging applications of wavelength-division-multiplexing (WDM) in local-area networks require wavelength demultiplexers that are compact, low-cost, manufacturable in high volumes, and most of all compatible with multimode fiber input. Multimode operation precludes the many single-mode waveguide demultiplexers used in dense WDM systems for telecommunications purposes.

A planar spectrograph demultiplexer is a two-dimensional grating spectrometer comprised of a slab waveguide which confines the light in the vertical direction and a concave reflection grating which simultaneously diffracts and images the input light, separating different wavelengths in an output image plane.

Referring to FIG. 1, formation of a planar spectrograph 10 within a layered dielectric slab waveguide for single-mode fiber applications is illustratively shown. Spectrograph 10 is formed by depositing a plurality of glass layers 17 to form slab waveguide 16 having a numerical aperture and a thickness of a center core layer 17b closely matched to single-mode fiber. Upper and lower cladding layers 17a and 17c are also provided. In FIG. 1, a concave trench 12 is lithographically patterned and then etched into the slab waveguide 16 with a grating structure 14 formed on a near face. The grating facets are then metallized by access through the open trench 12.

To enable the highest performance within the smallest possible footprint of spectrograph 10, aberrations in the diffracted images are reduced by means of an acircular grating curve with variable grating facet pitch (i.e., chirp). Manipulating the two degrees of grating freedom, curvature and pitch, allows for two stigmatic wavelengths. Grating resolution is optimized by varying the two stigmatic wavelengths to minimize aberrations over the full wavelength range of operation. The grating theory and design procedure have been developed along the lines described in the art.

In addition, for maximum diffraction efficiency, grating facets 28 are blazed (i.e., angled) to spectrally reflect the incident light to the diffracted image of a wavelength (the blaze wavelength) central to the wavelength range of operation. A saw-toothed echelette grating facet 28 may be employed. This optimum blaze angle will vary with facet position along the curved grating.

By allowing for arbitrary lateral profiles, the lithographic patterning and etching of grating 14 in spectrograph 10 facilitate the realization of such acircular, chirped gratings having continuously variable blazing.

For local area network (LAN) WDM applications, a critical demultiplexer feature is compatibility with input from multimode fiber (MMF). In particular, this would require a thick core layer (e.g., $\geq 62.5$ microns) for the spectrograph slab waveguide 16. Depositing and etching glass layers 17 to form a MMF-compatible planar spectrograph in a manner similar to that for the single-mode device are no longer practically or technically feasible for glass slab waveguide layers of these thicknesses. Past efforts at realizing MMF-compatible spectrographs fabricated thick-core glass slab waveguides by stacking thin glass sheets or by performing ion-exchange. Gratings were formed on an end face of the slab waveguide by replication of a ruled master grating, by holography, or by epoxying a separately ruled or etched grating. These approaches suffer from several drawbacks and difficulties with respect to their ultimate levels of performance and their ability to be packaged.

Referring to FIG. 2, a multimode planar spectrograph 29 representative of the prior art is illustrated where a reflective grating 24 is affixed to a slab waveguide glass stack 22 on an end that has been ground and polished into a concave surface. Stack 22 includes cladding layers 21 and a core layer 19. Grating 24 is pre-processed to form an echelette grating 26 before being attached to slab waveguide 22. Fabrication of an optimized chirped, acircular grating complete with continuously variable blazing similar to that for the single-mode spectrograph is non-trivial by traditional means. Control over one of the grating design parameters, chirp or curvature, must often be sacrificed, affording the possibility for only one stigmatic wavelength versus two for the grating patterned lithographically in spectrograph 10 (FIG. 1). Grating 24 will typically be formed through a grating ruling process or a holographic printing process. Grating ruling employs mechanical scribing with a diamond tip to create facets 28. To chirp the grating and/or vary the blazing, it is necessary to adjust the diamond tip between scribes. Since continual adjustment between successive scribes would be laborious, time-consuming, and expensive, the grating pitch and blaze are normally changed step-wise for only a few segments of the length of a ruled grating. Holographic grating definition can provide continuous chirping for aberration correction but with only one resultant stigmatic wavelength. Furthermore, blazing of holographic grating facets is limited.

Since grating 24, input fiber 27, and output array 31 are attached to slab waveguide 22 in separate steps, costly low throughput active alignment of either the grating or the input/output elements is required when using a corrected grating. Relative misalignments may occur and are an additional source of concern for aberrations in the output images.

By means of the LIGA process, multimode planar spectrographs have been made in polymer material systems using deep-etch X-ray lithography with parallel synchrotron radiation. Polymers, however, are generally frowned upon for use in LAN datacom transceivers due to their uptake of moisture in non-hermetic packaging, high sensitivity to operating temperature changes, and/or inability to survive elevated temperatures during transceiver solder reflow processing.

Meanwhile, grating spectrometers constitute a platform that will scale to higher WDM channel counts and tighter channel spacings with less added cost and more consistent performance than will presently competing serial-processing multimode demultiplexers that use dielectric interference filters.

Therefore, a need exists for multimode spectrographs, and a method for fabrication thereof, which are inexpensive, easy to manufacture, environmentally rugged, and unrestricted in terms of their grating design.

SUMMARY OF THE INVENTION

The present invention provides for multimode-fiber compatible spectrographs which are fabricated employing planar, batch processing of silicon wafers. By means of silicon deep reactive-ion etching, high-quality, aberration-corrected gratings defined lithographically and capable of realizing minimum device dimensions are etched into a silicon substrate. The diffraction grating is integrally formed in the substrate so as to be in operative relationship with input light to diffract and image the wavelength components of the input light to an output detector, fiber, or integrated waveguide array. Input/output coupling and passive alignment features can be integrated directly into the silicon substrate to facilitate low-cost, high-volume packaging. The thick-core slab waveguide responsible for coupling input light to and diffracted light from the etched grating may be formed in a plurality of ways, for example, as the top silicon layer in a thick-film silicon-on-insulator (SOI) wafer or as a hybrid thin glass element dimensioned and configured to fit within a recess formed within the silicon substrate.

A planar spectrograph for demultiplexing optical wavelength signals of the present invention includes a monolithic substrate. The substrate includes a diffraction grating etched therein, and the diffraction grating is integrally formed in the substrate to be in operative relationship with input light to diffract and reflect the input light to a detector. A recess is formed in the substrate, and a slab waveguide is dimensioned and configured to fit within the recess. The waveguide guides the input light to and from the diffraction grating.

In other embodiments, the substrate preferably includes silicon. The substrate defines a plane and the diffraction grating preferably includes a thickness perpendicular to the plane which is greater than or equal to a core diameter of multimode fiber. The substrate may include a feature integrally formed therein to accept an optical fiber. The substrate may include a feature integrally formed therein to accept a lens in operative relationship with the optical fiber. The optical fiber may include a single mode fiber or a multimode fiber. The slab waveguide may include glass. The diffraction grating may include an echelette grating profile. The diffraction grating may include a metallized grating to promote reflection. An index matching fluid is preferably disposed in a gap formed between the diffraction grating and the slab waveguide. The detector may include at least one of output fibers, photodetectors and a waveguide array. The detector may include an array of photosensitive panels which are selectively activated when the light diffracted from the diffraction grating falls thereon.

A planar spectrograph for demultiplexing optical wavelength signals in accordance with the present invention includes a silicon-on-insulator (SOI) structure including a monolithic first silicon layer forming a slab waveguide core, a second substrate layer and a waveguide cladding layer disposed therebetween. The SOI substrate includes a diffraction grating etched in the first silicon layer of silicon down to the waveguide cladding layer. The diffraction grating is integrally formed in the first silicon layer to be in operative relationship with an input light source to diffract and reflect input light to a detector.

In other embodiments, a thickness of the first silicon layer is greater than or equal to a core diameter of multimode fiber. The SOI substrate may include a feature integrally formed therein to accept an optical fiber. The SOI substrate may include a feature integrally formed therein to accept a lens in operative relationship with an optical fiber. The input light source may include one of a single mode fiber and a multimode fiber. The diffraction grating may include an echelette grating profile. The diffraction grating may include a metallized grating to promote reflection. The spectrograph may include a detector positioned to receive light diffracted from the diffraction grating. The detector may include an array of photosensitive panels which are selectively activated when the light diffracted from the diffraction grating falls thereon. The detector may include at least one of output fibers, photodetectors and a waveguide array.

A method for fabricating a planar spectrograph includes the steps of providing a monolithic substrate, lithographically patterning the substrate, deep etching the substrate in accordance with the lithographic pattern to integrally form a diffraction grating and a recess in the substrate, and securing a slab waveguide in the recess for directing light onto the diffraction grating and directing diffracted light from the diffraction grating.

In other methods, the deep etching preferably includes etching by reactive ion etching. The deep etching is preferably performed to a depth equal to or greater than a core diameter of a multimode fiber. The method may include the step of coating the diffraction grating to promote reflection. The method may include the step of applying an index matching fluid between the diffraction grating and the slab waveguide. The method may include the step of forming a groove in the substrate for an optical fiber. The method may include the step of forming a socket in the substrate for a lens.

Another method for fabricating a planar spectrograph includes the steps of providing a silicon-on-insulator substrate, lithographically patterning a first silicon layer of the substrate, and deep etching the first silicon layer in accordance with the lithographic pattern to integrally form a diffraction grating in the first silicon layer.

In other methods, the deep etching preferably includes reactive ion etching. The deep etching is preferably performed to a depth equal to or greater than a core diameter of multimode fiber. The method may include the step of coating the diffraction grating to promote reflections. The method may include the step of coating edge surfaces of the first silicon layer with an anti-reflection coating (ARC). The method may include the step of forming a groove in the silicon-on-insulator substrate for an optical fiber. The method may include the step of forming a socket in the silicon-on-insulator substrate for a lens.

These and other objects, features, and advantages of the present invention will become apparent from the following detailed description of illustrative embodiments thereof, as well as, of fabrication processes for manufacturing these spectrographs.

BRIEF DESCRIPTION OF DRAWINGS

The invention will be described in detail in the following description of preferred embodiments with reference to the following figures wherein:

FIG. 3 is a top view of a spectrograph of the present invention having a diffraction grating and a recess formed by deep etching a substrate;

FIG. 4 is a side cross-sectional view of the spectrograph of FIG. 3 having a diffraction grating and a recess formed by deep etching the substrate, wherein the recess accepts a slab waveguide;

DETAILED DESCRIPTION OF PREFERRED EMBODIMENTS

Figure 1:
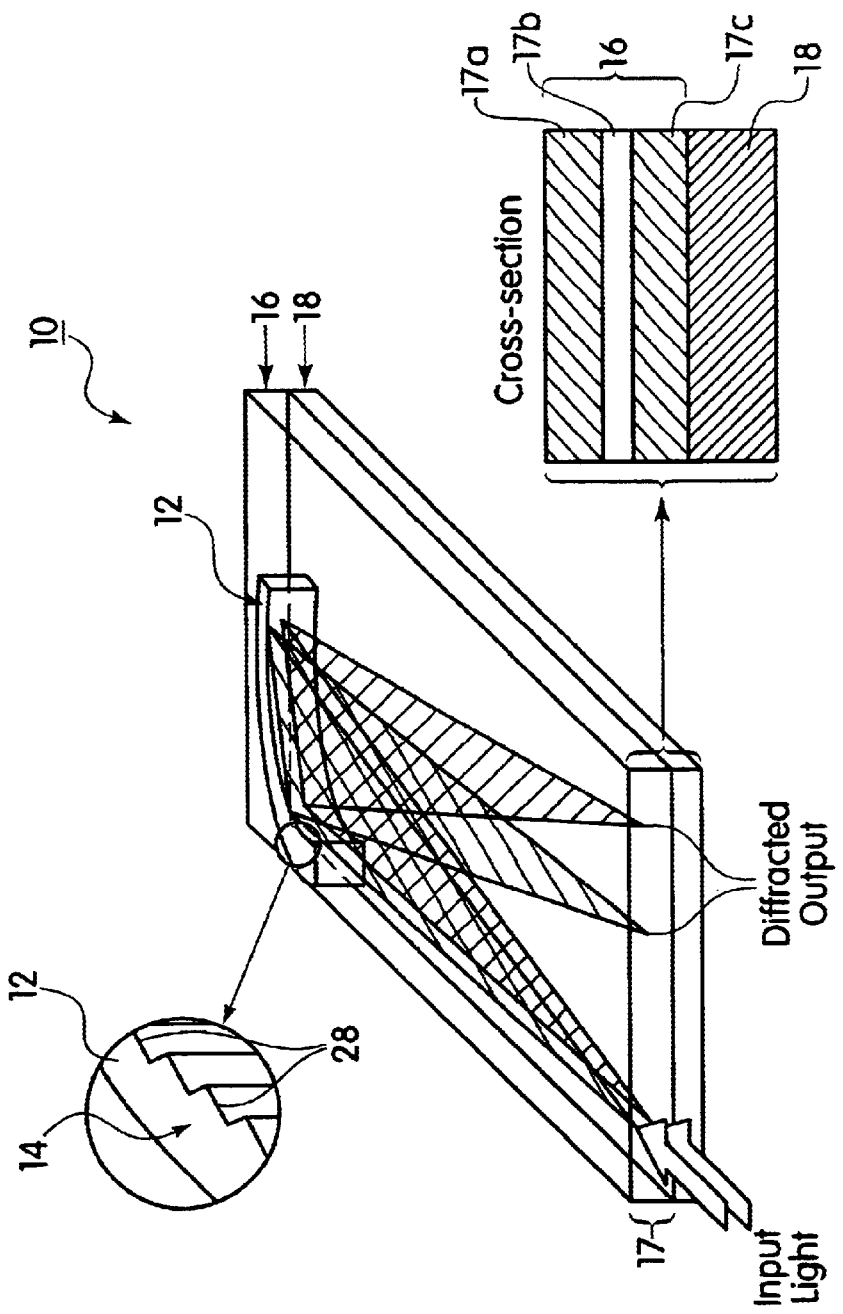
FIG. 1 is a perspective view of a conventional single-mode planar spectrograph with a dielectric slab waveguide fabricated by depositing and etching a plurality of individual glass layers on a substrate.
Figure 2:
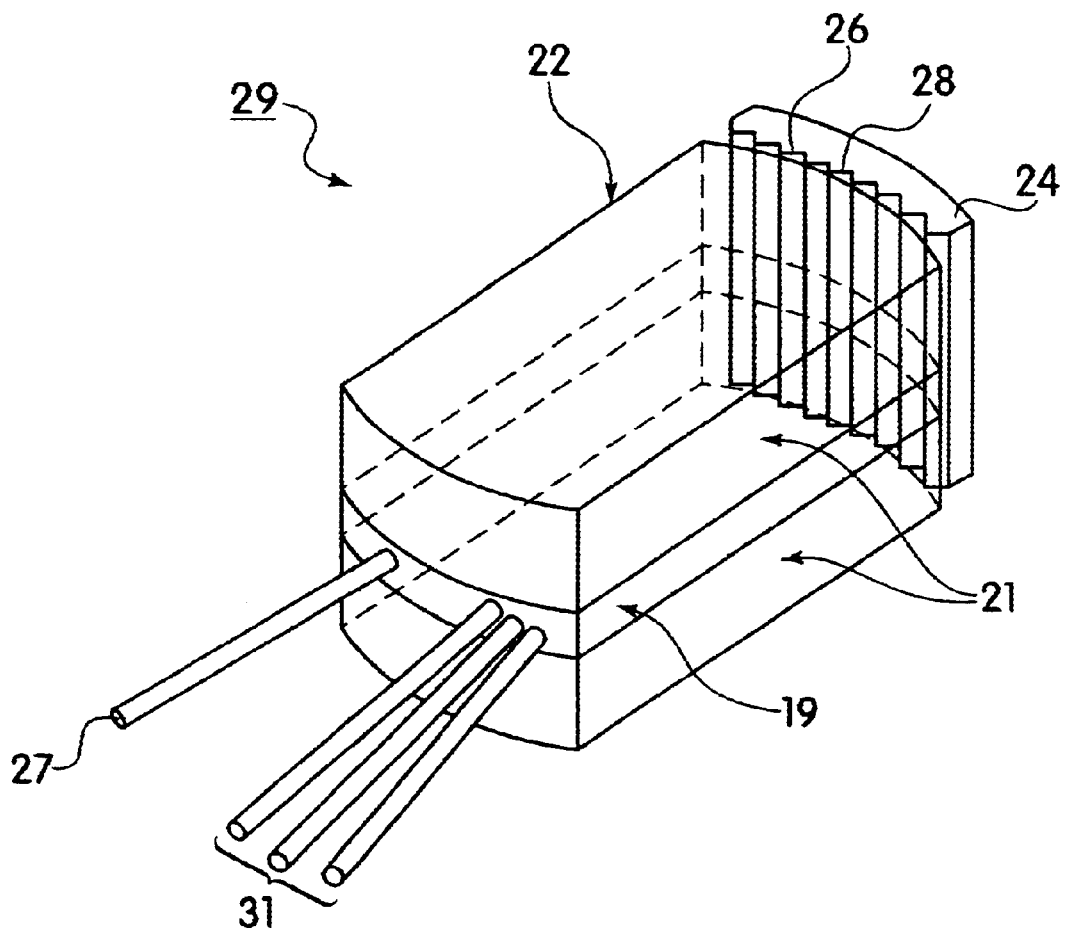
FIG. 2 is a perspective view of a conventional multimode spectrograph where a separate grating block is affixed to a stack of thin glass sheets forming a multimode slab waveguide.

The present invention provides planar spectrographs capable of demultiplexing optical wavelength signals on multimode optical fibers. The present invention provides silicon processing methods to deep etch aberration-corrected concave gratings to realize minimum spectrograph dimensions. Advantageously, the gratings are integrally formed in a substrate, eliminating alignment issues and promoting less expensive fabrication processes. Both glass and silicon-on-insulator slab waveguide schemes are presented, and embodiments satisfying coarse wavelength division multiplexed (CWDM) requirements for 10 Gigabit Ethernet are illustratively presented for understanding the present invention.

Considered in preferred embodiments of the present invention are flat-field spectrographs in which the positions I of the input and Di (i=1, 2, . . . ) of the diffracted images are designed to lay along a common line, such as, on a straight edge of a chip or substrate so as to facilitate coupling to an output fiber/detector array.

Referring now in detail to the figures in which like numerals represent the same or similar elements and initially to FIGS. 3 and 4, a slab waveguide spectrograph 100 is shown for one embodiment of the present invention. Spectrograph 100 includes a substrate 102, preferably a silicon substrate, although other substrate materials may be employed if adequate etching processes exist. Substrate 102 is lithographically processed to pattern a photoresist layer on substrate 102. Then, substrate 102 is anisotropically etched through the photoresist mask to transfer the pattern to substrate 102. This process may be performed with multiple mask materials or multiple layers of resist. A recess 108 is formed in substrate 102 to receive a slab waveguide element 106 therein. Recess 108 has precise dimensional tolerances since lithographic processing provides dimensional precision on the order of sub-micron sizes. This precision is also employed to integrally form a concave diffraction grating 110, for example, an echelette grating on a perimeter of recess 108. Grating 110 may include features which are customized dimensionally and may be formed to include different geometries as a function of position along grating 110. Other features may also be formed in substrate 102 during the same or different etching processes, for example, a socket 107 for a collimating input ball lens 109 and/or an input fiber groove 132.

Slab waveguide 106 couples light between input fiber 112, grating 110 and an output array 114. Slab waveguide 106 is inserted of fit into recess 108. Waveguide 106 preferably includes a transmissive materials selected for a given application. Gaps between facets of grating 110 and slab waveguide 106 are filled with index-matching fluid 118. Advantageously, because grating 110 and input/output alignment features are integrally formed in a common substrate 102 with lithographic precision, spectrograph alignment is automatic and complete is inserted into recess 108, eliminating costly separate alignment procedures and reducing misalignment aberrations.

In a preferred embodiment, spectrograph 100 is a MMF-compatible planar spectrograph incorporating a silicon substrate 102 and a thick slab waveguide 106. Waveguide 106 may include glass, quartz or other transmissive materials for guiding light between a fiber 112 and a detector array 114. Waveguide 106 may be processed by employing a grind and polish process. Silicon substrate 102 enables a high etch rate reactive ion etching (RIE) process to be used to deep etch recess 108 and grating 110 with vertical sidewalls to depths sufficient to accommodate a multimode fiber core of fiber 112. Silicon deep-RIE can etch depths as great as 500 microns at rates of between about 2 microns/min and about 6 microns/min. Prior art glass etching processes do not provide the same combination of rapid etching and vertical, high aspect ratio sidewalls with accuracy.

A MMF-compatible waveguide 106 may include, for example, thin glass used for display devices. This glass may be used to realize the thick (e.g., greater than 62.5 microns) core of the MMF-compatible glass slab waveguide without going through a long, expensive deposition process. The lower-index cladding may be formed by several methods. For example, a silicon dioxide layer 122 deposited on at least one side of a core glass sheet 124. Alternately, silicon oxynitride may be deposited if a precisely tailored index step is needed. Spinning on a polymer, or depositing a sol-gel glass may also be possible.

To pattern slab waveguide 106 into the proper shape for inserting into the etched recess 108 in substrate 102, a combination of laser glass cutting and standard grinding-and-polishing may be employed. Laser glass cutting (e.g., ±25 microns tolerance) is first used to cut the slab waveguide into rectangles, three sides of which constitute the straight edges of the final element. The thin rectangular slab waveguides are then arranged in a stack for grinding and polishing (e.g., ±10 microns tolerance) a curved end portion 130 that will be interfaced with concave grating 110. Compared to a scribing-breaking process, laser cutting provides a cut free of chipping and micro-cracks and should therefore yield an input facet that will not scatter the input light into unwanted higher-order slab waveguide modes. Otherwise, polishing would be necessary on the straight input edges of waveguide 106 as well as curved portion 130.

The size of any the gaps between the cut-and-polished slab waveguide 106 and grating 110 determines how closely the index-matching fluid 118 matches the waveguide core index, because the difference in path length as compared to design (i.e., with no gap) from double traversing the gap will appear as an added grating aberration. Considering 1300 nm operation, for a $\lambda/10$ maximum added aberration, the worst-case gap of 20 microns within grinding and polishing tolerances needs index matching to within 0.003 (0.2%) of the core index, which is well within known capabilities.

Since the preferred substrate 102 is implemented in silicon, features to aid in coupling the input to the spectrograph (e.g., a V-groove 132 for holding an input fiber and a socket 107 for holding input lens 109) may be etched in the silicon using known etch processes, and features may also be provided for coupling the output of the spectrograph to photodetectors, fibers or light waveguide array 134.

Figure 5:
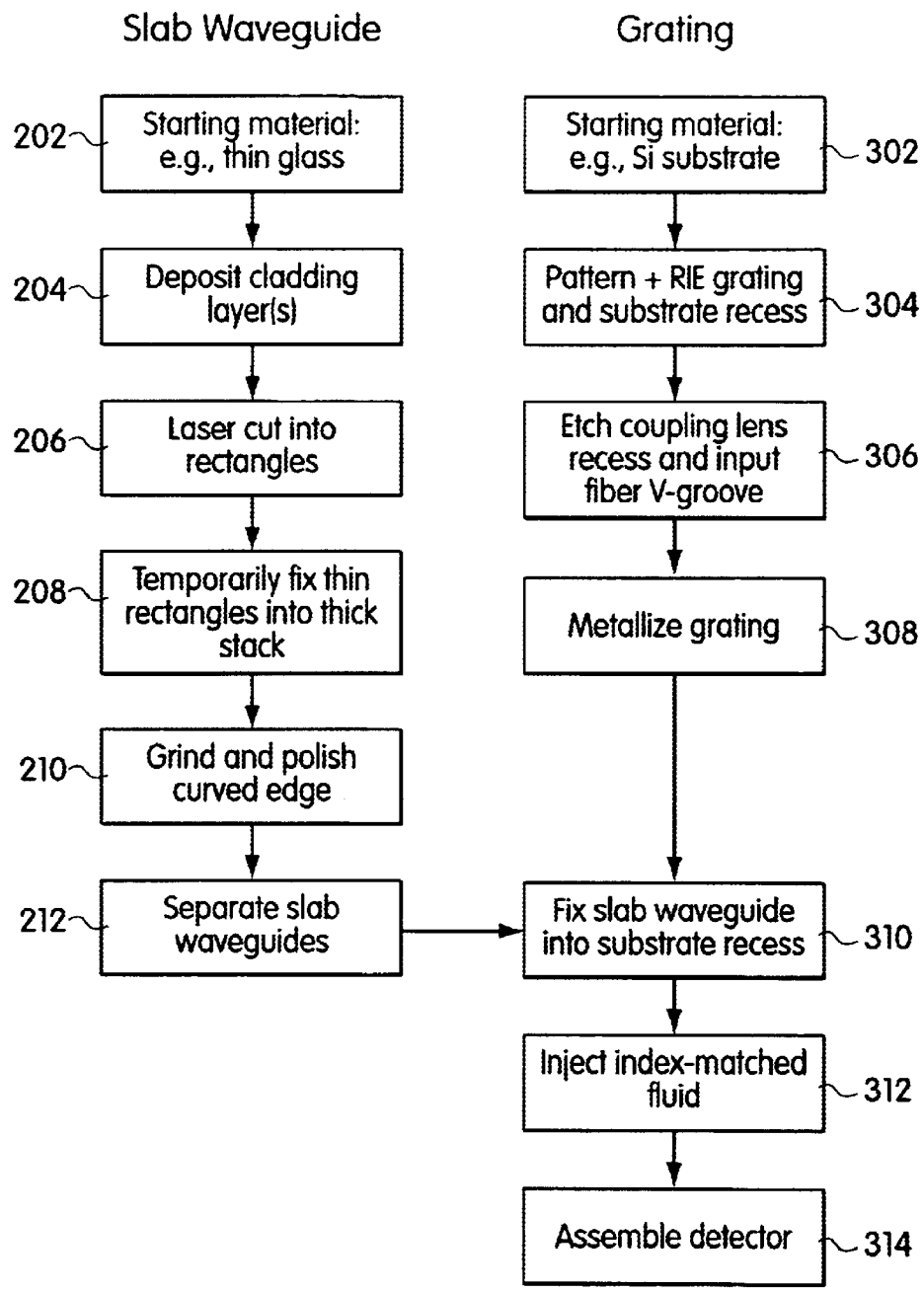
FIG. 5 is a flow chart showing an illustrative method for manufacturing a spectrograph in accordance with the present invention.

Referring to FIG. 5, a flow chart for fabricating a slab waveguide spectrograph 100 is illustratively shown for one embodiment of the present invention. In block 202, a starting material is provided for fabricating a slab waveguide. The material may include glass. In block 204, cladding layers, e.g., silicon dioxide, are deposited. Other methods may also be employed to form the slab waveguide, as described above, e.g., spun on polymers, etc. Rectangular slabs are cut from the starting material with deposited cladding layers in block 206. The rectangles may be stacked to process multiple slabs simultaneously, in block 208. Now, the slab waveguide is ground and polished to form a curved edge on one side of the slab waveguide for interfacing with a concave spectrograph grating, in block 210. In block 212, the slab waveguides temporarily stacked are separated. A plurality of slab waveguides are available for integration with a grating structure, in block 310.

In block 302, a substrate material is provided, e.g., silicon. In block 304, the substrate is patterned by developing a resist layer on the substrate and etching the substrate in accordance with the resist pattern. The substrate is etched by a deep reactive ion etch process (e.g., over 62.5 microns) to form a diffraction grating, such as an echelette grating, along a concave acircular curve. Also, a recess is formed, adapted to receive a slab waveguide. The recess is dimensioned and configured to align the slab waveguide to avoid aberrations due to misalignment. In a same or subsequent step, a coupling lens recess and input fiber V-groove are formed by etching the substrate, in block 306. In block 308, the grating formed by etching is metallized to reflect and diffract incident light.

In block 310, a slab waveguide from block 212 is positioned in the recess of the substrate. The recess and the slab waveguide are dimensioned and configured to provide an automatic alignment so that light propagating through slab waveguide is aligned between the input and the grating of substrate to prevent output image aberrations. In block 312, index-matching fluid is injected into any gaps between the slab waveguide and the grating. In block 314, assembly is completed by positioning a photodetector on the spectrograph or by fixing lenses or other accessories on the device.

Figure 6:
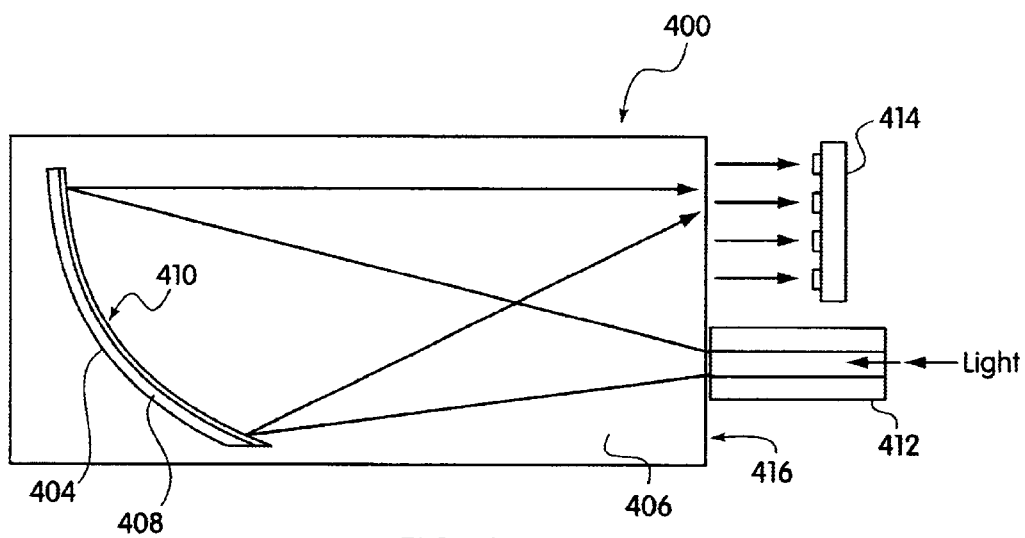
FIG. 6 is a top view of a spectrograph of the present invention having a diffraction grating formed by deep etching the top silicon layer of a silicon-on-insulator (SOI) substrate.
Figure 7:
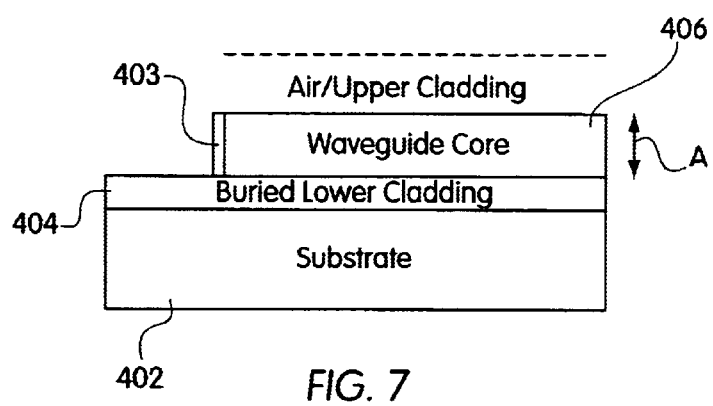
FIG. 7 is a side cross-sectional view of the spectrograph of FIG. 6 showing the SOI layers in accordance with the present invention.

Referring to FIGS. 6 and 7, a layout for a MMF-compatible silicon-on-insulator (SOI) planar spectrograph is illustratively shown in accordance with another embodiment of the present invention. A multimode slab waveguide 400 is formed in SOI layers 402, 404 and 406. A top silicon layer 406 includes the waveguide core, a buried oxide 404 includes the lower cladding. Air or a doped portion of layer 406 may be employed as the upper cladding as illustratively shown in FIG. 7. Substrate 402 preferably includes silicon. A metallized grating portion 403 etched into waveguide core layer 406 is illustratively shown in FIG. 7.

The thick waveguide core 406 is realized through SOI wafer bonding and etchback process. Thick core 406 preferably includes a thickness "A", for example, of at least 62.5 microns, for example about 70 microns, for MMF compatibility. Two silicon wafers 402 and 406, one or both of which have been oxidized, are bonded to create a buried oxide layer 404 therebetween. The top device wafer 406 is then etched back to the desired waveguide core thickness. Deep silicon RIE is preferably employed to etch a high-quality grating 410 into the top silicon layer 406, which forms the slab waveguide core. Grating 410 enjoys the high precision and arbitrary lateral patterning afforded by lithographic patterning and etching. Grating 410 is metallized to further increase reflective properties of grating 410. An anti-reflection coating is applied to the input/output facet 416 of slab waveguide 400 to suppress Fresnel reflection, which could otherwise be about 30%. Dopants may be implanted at the surface of core layer 406 to form a lower-index upper cladding layer (e.g., instead of air) and realize a lower numerical aperture (NA) for the slab waveguide.

Formation of a fiber groove within substrate 402 may be employed to support and align an input fiber 412. A photodetector array 414 may be provided to detect reflected and diffracted light from grating 410. Alternately, an array of output fibers (414) may be employed with fiber grooves formed within substrate 402 to provide alignment.

Figure 8:
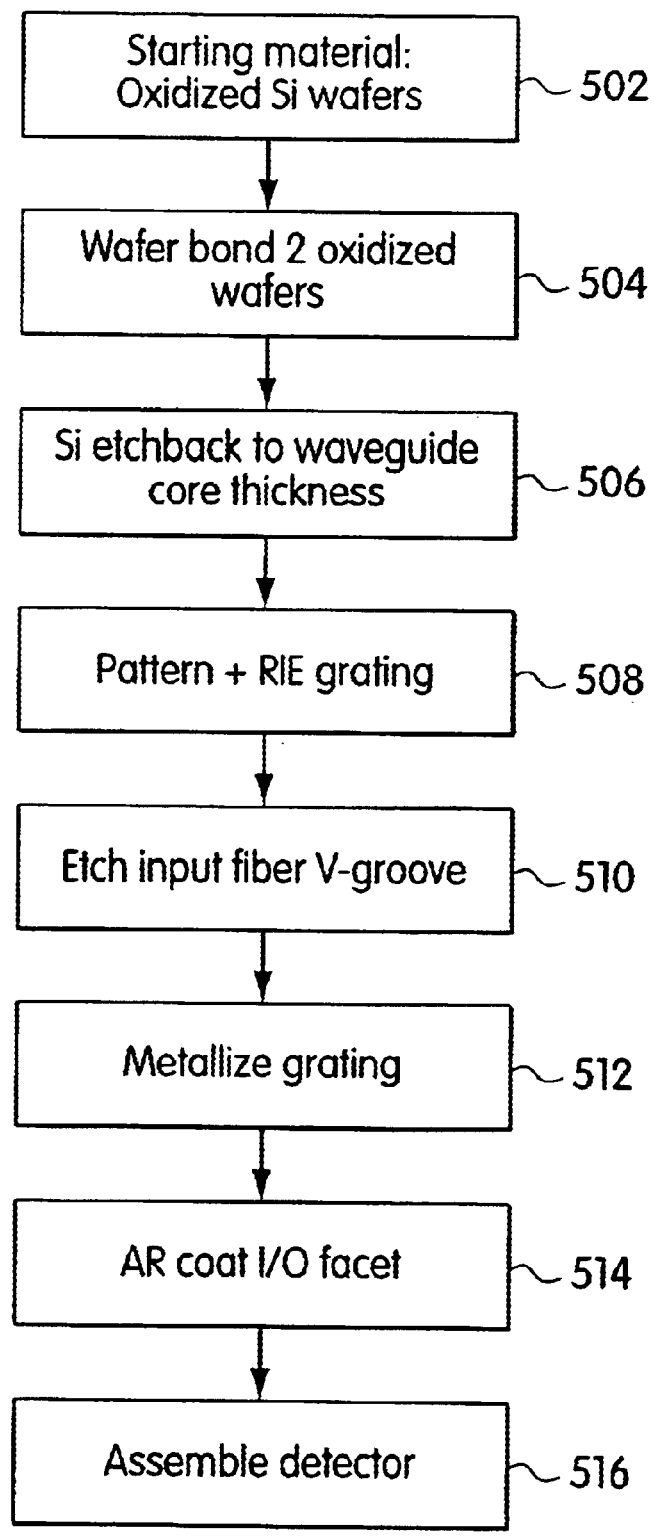
FIG. 8 is a flow chart showing an illustrative method for manufacturing a SOI spectrograph in accordance with the present invention.

Referring to FIG. 8, a process flow chart for the fabrication of a SOI spectrograph is illustratively shown. In block 502, two oxidized silicon wafers or an oxidized silicon wafer and a bare silicon wafer are provided. In block 504, the wafers are bonded to form a silicon, oxide (or other dielectric layer), silicon (or other substrate material)(SOI) structure. In block 506, one silicon wafer is etched back to the desired waveguide core thickness. In block 508, a grating, such as, an echelette grating is etched by a separate deep reactive ion etch process into the slab waveguide core layer formed in block 506. Echelette facets are patterned by lithography, which includes depositing a resist, selectively exposing the resist to light (or electrons), in accordance with a photomask, and developing the resist. The underlying silicon is then etched in accordance with the patterned resist. In block 510, a V-groove for an input fiber is etched, and in block 512, the grating facets are metallized. In block 514, an anti-reflection coating is deposited on input and output facets, e.g., where light enters and exits silicon slab material. In block 516, photodetectors and other accessories are attached or positioned on the spectrograph.

Performance Factors

The WDM channel resolution, i.e., $\Delta\lambda_{Resolution}$ of a spectrograph is governed by the following expression:

$$\frac{dx}{d\lambda}\Delta\lambda_{Resolution} = ImageSpotSize + \frac{dx}{d\lambda}\Delta\lambda \quad (1)$$

$$\Delta\lambda_{Resolution} = \frac{ImageSpotSize}{dx/d\lambda} + \Delta\lambda.$$

Here $dx/d\lambda$ is the wavelength linear dispersion in the spectrograph output plane, and $\Delta\lambda$ accounts for shifting plus broadening of the diffracted output spots, which are otherwise images of the input. Contributions to $\Delta\lambda$ include:

(1) $\Delta\lambda_{laser\ drift}$=Wavelength variation of the laser light source with temperature and processing, (2) $\Delta\lambda_{spec.drift}$ =Wavelength variation of the spectrograph with temperature, (3) $\Delta\lambda_{launch}$=Bandwidth of effective modal wavelengths excited by the launch into the spectrograph slab waveguide (a function of the input NA), (4) $\Delta\lambda_{facet\ tilt}$=Equivalent broadening of the diffracted image due to mode mixing by reflection from tilted grating facets, (5) $\Delta\lambda_{scattering}$=Equivalent broadening of the diffracted image due to coupling into higher-order slab waveguide modes by scattering events.

These factors all add to yield the total $\Delta\lambda$.

$$\Delta\lambda = \Delta\lambda_{laserdrift} + \Delta\lambda_{spec.drift} + \Delta\lambda_{launch} + \Delta\lambda_{facet\;tilt} + \Delta\lambda_{scattering} \quad (2)$$

For example, in 10 Gigabit Ethernet (GbE) applications, uncooled operation and fabrication variances of the distributed feedback (DFB) lasers cause $\Delta\lambda_{laser\;drift}$ of nominally 10 nm, while $\Delta\lambda_{spec.drift}$ is approximately 0.7 nm and approximately 5 nm for glass and SOI slab waveguide spectrographs, respectively. Laser and spectrograph temperature drifts are additive since distant lasers and spectrographs can be subjected to uncorrelated temperature environments. Deep silicon RIE provides negligible $\Delta\lambda_{facet\;tilt}$. $\Delta\lambda_{scattering}$ is related to the quality of the spectrograph fabrication process and can be assessed only through testing actual devices.

EXAMPLES OF CWDM SPECTROGRAPH DEMULTIPLEXERS

Some operating specifications for a coarse WDM (CWDM) demultiplexer for 10 Gigabit Ethernet (10 GbE) are illustratively listed in Table 1.

TABLE 1

10 GbE CWDM Specifications

1. $\Delta\lambda$ channel = 25 nm (1275, 1300, 1325, 1350 nm)
2. 0–70° C. operating range
3. No temperature control
4. Channel passbands of approximately 10 nm ($\Delta\lambda_{laser\;drift}$ of uncooled DFB's)
5. MMF compatibility Some examples of spectrograph embodiments satisfying 10 GbE CWDM operating specifications are illustratively described below, selected as those with the smallest footprints having (1) an output channel pitch sufficient to accommodate the anticipated $\Delta\lambda$ and (2) grating facets deemed sufficiently large to be within deep RIE resolution capabilities. A 62.5 micron MMF input (NA=0.275) and 1:1 spectrograph imaging are considered exclusively for simplicity.

Figure 9:
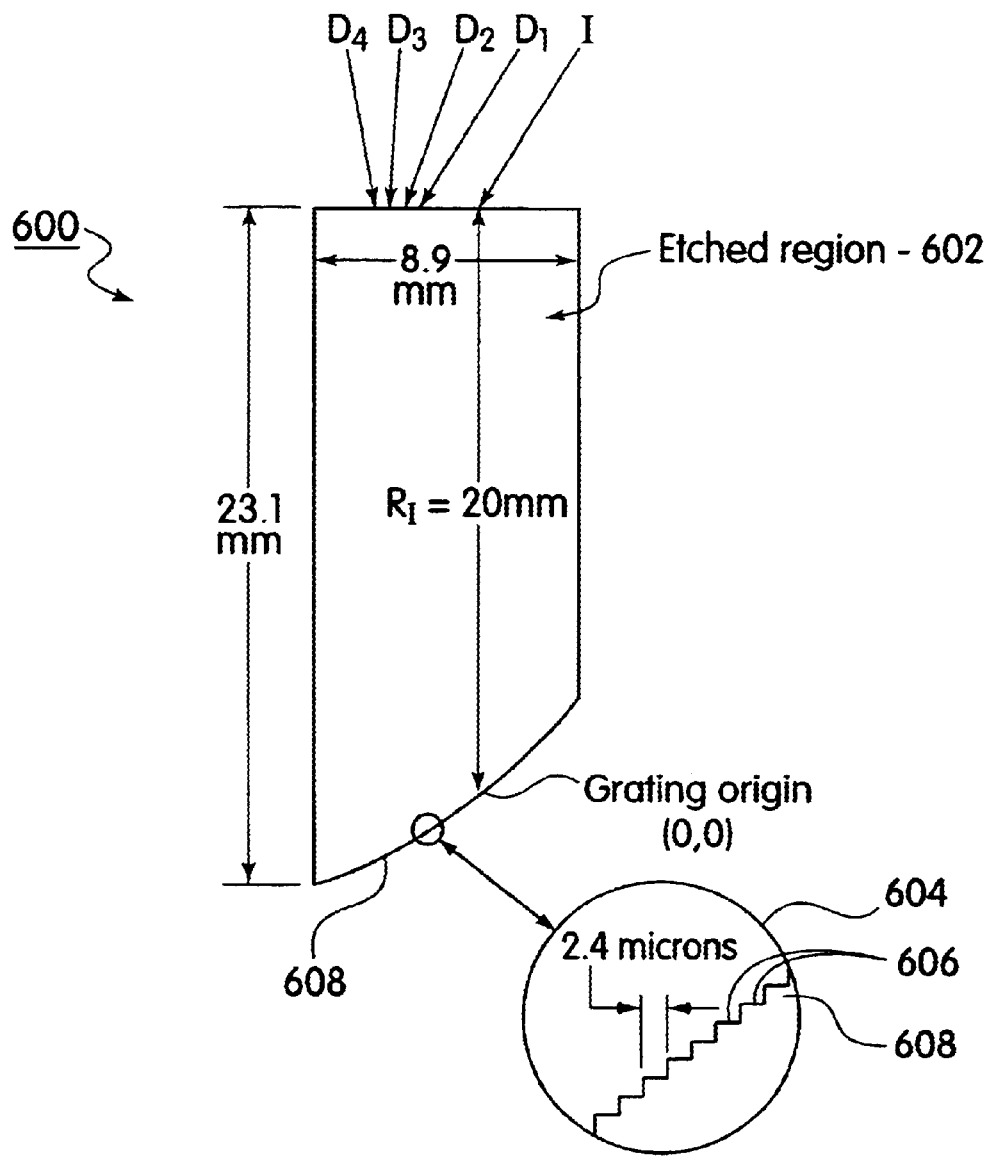
FIG. 9 is a schematic layout of one embodiment of a glass slab waveguide spectrograph in accordance with the present invention.

Referring to FIG. 9, a schematic layout of an illustrative spectrograph substrate 600 is shown in accordance with one embodiment of the present invention (see also, FIGS. 3 and 4). The layout and dimensions illustratively shown in FIG. 9 are those of an etched recess, for a preferred 10 GbE CWDM spectrograph design incorporating a slab waveguide. These dimensions are illustrative and may be varied or modified by those skilled in the art to achieve desired results. In FIG. 9, I denotes the input point and Di (where i=1, 2, 3, 4) denotes the diffracted channel output points (Recess dimensions in etched region 602 are in mm to accept a separate glass slab waveguide element; grating facet dimensions within the inset region 604 are in microns). Echelette grating facets 606 are illustratively shown for an echelette grating 608 formed in accordance with the invention. Table II summarizes the corresponding spectrograph parameters.

TABLE II

| Spectrograph Parameter | Value in Example |
| --- | --- |
| Input distance $R_I$ | 20 mm |
| Output channel pitch | 500 microns |
| Angle of incidence $\theta_r$ | 37.87° |
| Stigmatic wavelengths | 1280, 1345 nm |
| Expansion coefficients of concave Grating curve g (x) for a Taylor series expansion: | |
| g" (x = 0) | 0.050839 mm$^{-1}$ |
| g'" (x = 0) | 4.6783 × 10$^{-4}$ mm$^{-2}$ |
| g$^{(4)}$ (x = 0) | 3.9545 × 10$^{-4}$ mm$^{-3}$ |
| Expansion coefficients of Facet numnber nP (x) for a Taylor series expansion: | |
| $n_p'$ (x = 0) | 0.25643 mm$^{-1}$ |
| $n_p''$ (x = 0) | 0.0036575 microns$^{-1}$ mm$^{-1}$ |
| $n_p'''$ (x = 0) | 4.8708 × 10$^{-4}$ microns$^{-1}$ mm$^{-2}$ |
| $n_p^{(4)}$ (x = 0) | 3.2297 × 10$^{-5}$ microns$^{-1}$ mm$^{-3}$ |
| Avg. facet pitch (1/$n_p'$) (x = 0) | 3.90 microns |
| Diffraction order m | 5 |
| Maximum vertical component of input launch NA (This maximum vertical NA launch value presumes $\Delta\lambda_{scattering}$ = 0. Scattering at the input facet will otherwise excite higher-order slab waveguide modes, increasing $\Delta\lambda_{launch}$ and decreasing resolution. Similarly, scattering within the slab waveguide and from the grating will increase background channel crosstalk.) | 0.2 |
| Minimum magnification of MMF input by a spherical lens | 1.5 x |

As seen in Table II, reduction in the vertical component of the NA of an input 62.5 micron MMF (NA=0.275) is needed for the glass slab waveguide CWDM spectrograph to suppress excitation of higher order slab waveguide modes. An uncompensated launch from 62.5 micron MMF would otherwise couple into a $\Delta\lambda_{launch}$ too large to maintain the CWDM 25 nm channel resolution. The input magnification factor given in Table II is the minimum magnification needed of a spherical ball coupling lens to adequately reduce the launch NA into the spectrograph from a 62.5 micron MMF.

Figure 10:
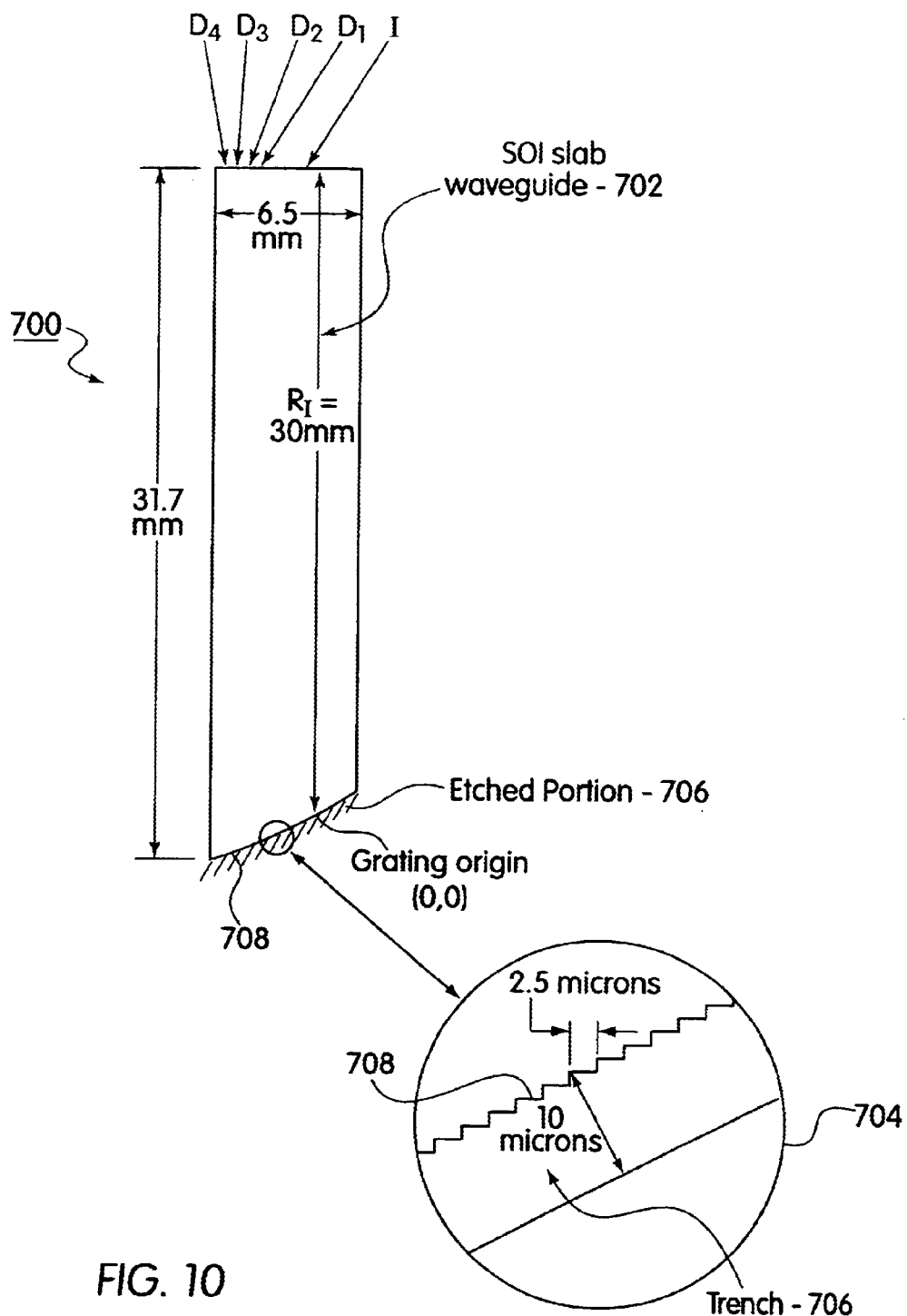
FIG. 10 is a schematic layout of one embodiment of a SOI spectrograph in accordance with the present invention.

Referring to FIG. 10, a schematic layout of an illustrative SOI slab waveguide spectrograph 700 is shown in accordance with one embodiment of the present invention (see also FIGS. 6 and 7). The layout and dimensions are illustratively shown in FIG. 10 are for a preferred 10 GbE CWDM design of the SOI slab waveguide spectrograph. These dimensions are illustrative and may be varied or modified by those skilled in the art to achieve desired results. In FIG. 10, I denotes the input point and Di (where i=1, 2, 3, 4) denotes the diffracted channel output points (dimensions are in mm in slab waveguide region 702; grating facet dimensions within the inset region 704 are in microns). Inset region 704 shows a trench 706 etched in accordance with the present invention to form grating 708 by a silicon deep RIE process. Trench 706 in this embodiment includes a width of about 10 microns. Table III summarizes the corresponding spectrograph parameters.

TABLE III

| Spectrograph Parameter | Value in Example |
| --- | --- |
| Input distance $R_I$ | 30 mm |
| Output channel pitch | 500 microns |
| Angle of incidence $\theta_I$ | 26.49° |
| Stigmatic wavelengths | 1280, 1345 nm |
| Expansion coefficients of concave Grating curve g (x) for a Taylor series expansion: | |
| $g''$ (x = 0) | 0.033939 mm$^{-1}$ |
| $g'''$ (x = 0) | 9.4646 × 10$^{-5}$ mm$^{-2}$ |
| $g^{(4)}$ (x = 0) | 1.1235 × 10$^{-4}$ mm$^{-3}$ |
| Expansion coefficients of Facet number $n_p'$ (x) for a Taylor series expansion: | |
| $n_p'$ (x = 0) | 0.35933 mm$^{-1}$ |
| $n_p''$ (x = 0) | 0.0028823 microns$^{-1}$ mm−1 |
| $n_p'''$ (x = 0) | 1.9492 × 10 − 4 microns$^{-1}$ mm$^{-2}$ |
| $n_p^{(4)}$ (x = 0) | 6.4758 × 10 − 7 microns$^{-1}$ mm$^{-3}$ |
| Avg. facet pitch (1/$n_p'$ (x = 0) | 2.78 microns |
| Diffraction order m | 6 |
| Maximum vertical component of input launch NA. (This maximum vertical NA launch value presumes $\Delta\lambda_{scattering}$ = 0. Scattering at the input facet will otherwise excite higher-order slab waveguide modes, increasing $\Delta\lambda_{launch}$ and decreasing resolution. Similarly, scattering within the slab waveguide and from the grating will increase background channel crosstalk.) | 0.36 |
| Magnification of MMF input by spherical lens | N/A |

The high core refractive index of the SOI permits a higher input NA due to a reduction of $\Delta\lambda_{launch}$. In Table III, the amount by which the maximum input NA exceeds the NA of multimode fiber represents the level of immunity of the SOI spectrograph to scattering into higher order slab waveguide modes.

Input/Output Coupling

Special considerations may be given to both input and output coupling of the spectrograph.

The vertical component of the input MMF NA may be reduced to limit $\Delta\lambda_{launch}$ to acceptable levels for achieving a particular spectrograph resolution. This may be accomplished by incorporating a ball lens (FIGS. 3 and 4) or a cylindrical rod lens in the space between the input fiber and the slab waveguide to provide the needed input magnification or collimation, respectively. Since silicon is preferably employed for the substrate of the spectrograph, sockets 108 (FIG. 4) for securing the lens can be etched into the substrate. A V-groove for anchoring the input fiber can also be fabricated using the same methods. Both the lens socket and fiber V-groove can be etched to micron-scale precision, and their positions may be keyed to those of the waveguide receptacle and grating, thus providing excellent mutual alignment.

The diffracted output images of the spectrograph will spatially drift due to $\Delta\lambda_{laser\ drift}+\Delta\lambda_{spec.drift}$ and broaden due to $\Delta\lambda_{launch}+\Delta\lambda_{facet\ tilt}+\Delta\lambda_{scattering}$. Broadening from $\Delta\lambda_{launch}+\Delta\lambda_{facet\ tilt}+\Delta\lambda_{scattering}$ is minimized through proper spectrograph design and fabrication, as described above.

Figure 11:
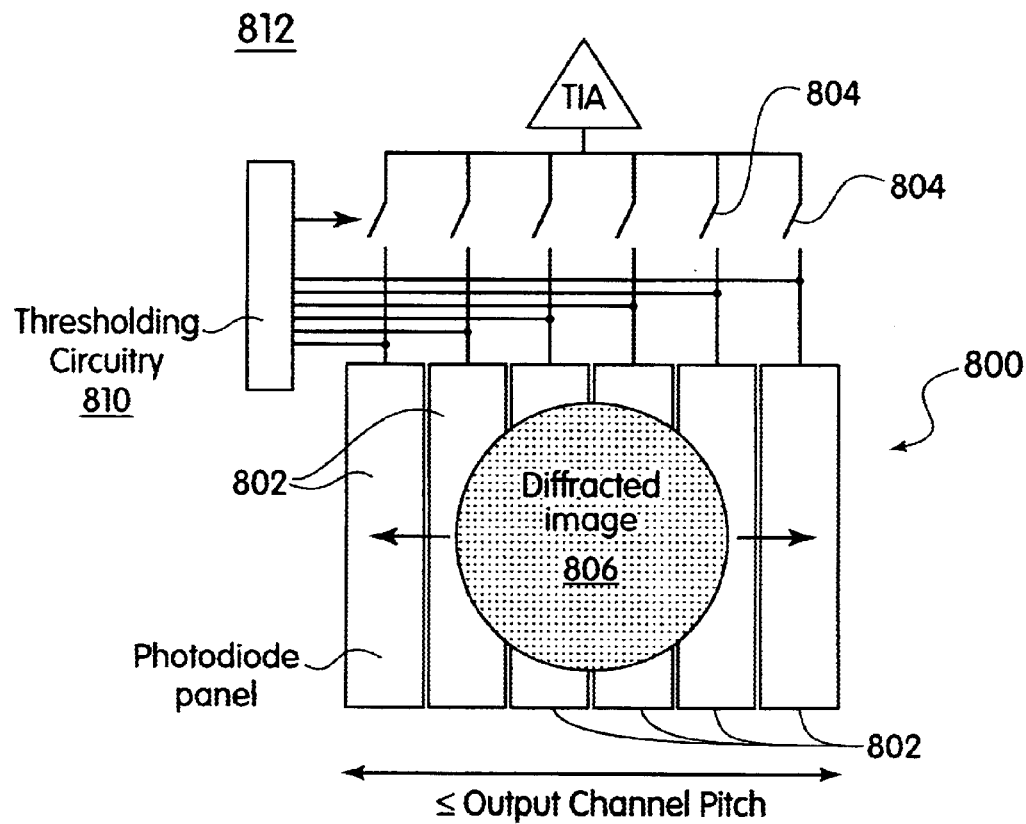
FIG. 11 is a schematic diagram of a "smart" detector array in accordance with the present invention for accommodating wavelength variations.

A lens array may be used to focus the drifting and broadened output images to individual output detectors or fibers. Alternately, a closely-spaced array 800 of rectangular shaped high-speed photodetectors 802 may be employed for each wavelength channel as illustrated in FIG. 11, wherein only those few array elements upon which a slowly drifting diffracted image 806 falls are activated through switches 804 at any one time. A transimpedence amplifier (TIA) is illustratively shown for amplifying photocurrents. The selective activation is carried out using thresholding circuitry 810. Thresholding circuits known in the art may be employed for such applications. This "smart" distributed-detector arrangement represents a low-cost solution for output coupling for high-speed applications. Distributed-detector arrangement fabrication requires no more processing steps than required by a monolithic array of single photodiodes for each wavelength channel, which would be used in the absence of significant $\Delta\lambda$.

Aberration-corrected concave gratings make possible planar spectrograph demultiplexers of reduced dimensions suitable for packaging within datacom local area network (LAN) transceivers. To achieve multimode fiber compatibility and low cost, the acircular, chirped gratings are fabricated in a silicon substrate by photolithographic patterning and high-aspect ratio, high etch-rate deep RIE in accordance with the present invention. For the thick-core multimode slab waveguides interfaced with the gratings, both glass and SOI slab waveguide embodiments are possible.

Preferred spectrograph demultiplexer designs for 10 GbE CWDM have been presented. These spectrographs are designed to achieve the necessary CWDM channel resolution in the presence of wavelength drifts from uncooled operation and effects of multimode slab waveguide dispersion.

The output coupling is a challenge for 10 GbE CWDM operation. A large output aperture is demanded to accommodate spatial shifting of the spectrograph output images with temperature and broadening of the images from effects of multimode slab waveguide dispersion. To provide this large aperture, a distributed detector array may be used together with thresholding circuitry that maintains GHz speeds by activating only those array elements receiving light.

It is noted that by significantly reducing $\Delta\lambda_{laser\ drift}$, use of wavelength-stable external cavity lasers or temperature controlled lasers would facilitate the overall design of planar spectrograph demultiplexers, either relaxing fabrication tolerances or enabling smaller footprints. It should be understood that the embodiments of the present invention may be employed for single mode fiber demultiplexing as well.

Having described preferred embodiments of multimode planar spectrographs for wavelength demultiplexing and methods of fabrication (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A planar spectrograph for demultiplexing optical wavelength signals, comprising:
   a monolithic substrate, the substrate including:
      a diffraction grating etched therein, the diffraction grating being integrally formed in the substrate to be in operative relationship with input light to diffract and reflect the input light to a detector, wherein the substrate defines a plane and the diffraction grating includes a thickness perpendicular to the plane which is greater than or equal to a core diameter of a multimode fiber; and a recess formed in the substrate; and a slab waveguide dimensioned and configured to fit within the recess, the waveguide guides the input light to and from the diffraction grating.

2. The spectrograph as recited in claim 1, wherein the substrate includes silicon.

3. The spectrograph as recited in claim 1, wherein the substrate includes a feature integrally formed therein to accept an optical fiber.

4. The spectrograph as recited in claim 1, wherein the slab waveguide includes glass.

5. The spectrograph as recited in claim 1, wherein the diffraction grating includes an echelette grating profile.

6. The spectrograph as recited in claim 1, wherein the diffraction grating includes a metallized grating to promote reflection.

7. The spectrograph as recited in claim 1, wherein an index matching fluid is disposed in a gap formed between the diffraction grating and the slab waveguide.

8. The spectrograph as recited in claim 1, wherein the detector includes at least one of output fibers, photodetectors and a waveguide array.

9. The spectrograph as recited in claim 1, wherein the detector includes an array of photosensitive panels which are selectively activated when the light diffracted from the diffraction grating falls thereon.

10. A planar spectrograph for demultiplexing optical wavelength signals, comprising:

a monolithic substrate, the substrate including:

a diffraction grating etched therein, the diffraction grating being integrally formed in the substrate to be in operative relationship with input light to diffract and reflect the input light to a detector; and a recess formed in the substrate; and a slab waveguide dimensioned and configured to fit within the recess, the waveguide guides the input light to and from the diffraction grating, wherein the substrate includes a feature integrally formed therein to accept an optical fiber and wherein the substrate includes a feature integrally formed therein to accept a lens in operative relationship with the optical fiber.

11. The spectrograph as recited in claim 10, wherein the optical fiber includes one of a single mode fiber and a multimode fiber.

12. A planar spectrograph for demultiplexing optical wavelength signals, comprising:

a silicon-on-insulator (SOI) structure including a monolithic first silicon layer forming a slab waveguide core, a second substrate layer and a waveguide cladding layer disposed therebetween, the SOI substrate including:

a diffraction grating etched in the first silicon layer of silicon down to the waveguide cladding layer, the diffraction grating being integrally formed in the first silicon layer to be in operative relationship with an input light source to diffract and reflect input light to a detector, wherein the diffraction grating includes a concave echelette grating profile.

13. The spectrograph as recited in claim 12, wherein a thickness of the first silicon layer is greater than or equal to a core diameter of multimode fiber.

14. The spectrograph as recited in claim 12, wherein the SOI substrate includes a feature integrally formed therein to accept an optical fiber.

15. The spectrograph as recited in claim 12, wherein the SOI substrate includes a feature integrally formed therein to accept a lens in operative relationship with an optical fiber.

16. The spectrograph as recited in claim 12, wherein the input light source includes one of a single mode fiber and a multimode fiber.

17. The spectrograph as recited in claim 12, wherein the diffraction grating includes a metallized grating to promote reflection.

18. The spectrograph as recited in claim 12, further comprising a detector positioned to receive light diffracted from the diffraction grating.

19. The spectrograph as recited in claim 12, wherein the detector includes an array of photosensitive panels which are selectively activated when the light diffracted from the diffraction grating falls thereon.

20. The spectrograph as recited in claim 12, wherein the detector includes at least one of output fibers, photodetectors and a waveguide array.

21. A method for fabricating a planar spectrograph comprising the steps of:

providing a monolithic substrate;

lithographically patterning the substrate;

deep etching the substrate in accordance with the lithographic pattern to integrally form a diffraction grating and a recess in the substrate, wherein the deep etching is performed to a depth equal to or greater than a core diameter of a multimode fiber; and securing a slab waveguide in the recess for directing light onto the diffraction grating and directing diffracted light from the diffraction grating.

22. The method as recited in claim 21, wherein the deep etching includes etching by reactive ion etching.

23. The method as recited in claim 21, further comprising the step of coating the diffraction grating to promote reflection.

24. The method as recited in claim 21, further comprising the step of applying an index matching fluid between the diffraction grating and the slab waveguide.

25. The method as recited in claim 21, further comprising the step of forming a groove in the substrate for an optical fiber.

26. The method as recited in claim 21, further comprising the step of forming a socket in the substrate for a lens.

27. A method for fabricating a planar spectrograph comprising the steps of:

providing a silicon-on-insulator substrate;

lithographically patterning the first silicon layer of the substrate; and deep etching the first silicon layer in accordance with the lithographic pattern to integrally form a diffraction grating in the first silicon layer, wherein the diffraction grating includes a concave echelette grating profile.

28. The method as recited in claim 27, wherein the deep etching includes reactive ion etching.

29. The method as recited in claim 27, wherein the deep etching is performed to a depth equal to or greater than a core diameter of multimode fiber.

30. The method as recited in claim 27, further comprising the step of coating the diffraction grating to promote reflections.

31. The method as recited in claim 27, further comprising the step of coating edge surfaces of the first silicon layer with an anti-reflection coating (ARC).

32. The method as recited in claim 27, further comprising the step of forming a groove in the silicon-on-insulator substrate for an optical fiber.

33. The method as recited in claim 27, further comprising the step of forming a socket in the silicon-on-insulator substrate for a lens.

34. A method for fabricating a planar spectrograph comprising the steps of:

providing a monolithic substrate;

lithographically patterning the substrate;

deep etching the substrate in accordance with the lithographic pattern to integrally form a diffraction grating and a recess in the substrate;

securing a slab waveguide in the recess for directing light onto the diffraction grating and directing diffracted light from the diffraction grating; and applying an index matching fluid between the diffraction grating and the slab waveguide.

* * * * *